United States Patent [19]

Morichika et al.

[11] Patent Number: 5,082,750
[45] Date of Patent: Jan. 21, 1992

[54] MAGNETIC RECORDING MEDIUM OF THIN METAL FILM TYPE

[75] Inventors: Toshiaki Morichika, Hirakata; Toshio Tani, Takatsuki; Chiaki Sakai, Osaka; Hideo Koshimoto, Takatsuki; Tatsuhiko Kadowaki, Ibaraki, all of Japan

[73] Assignee: Kubota Ltd., Kawasaki, Japan

[21] Appl. No.: 424,500

[22] Filed: Oct. 20, 1989

[30] Foreign Application Priority Data

Oct. 21, 1988 [JP] Japan .................................. 63-266955
Jun. 9, 1989 [JP] Japan .................................. 1-147640

[51] Int. Cl.$^5$ .............................................. G11B 23/00
[52] U.S. Cl. .................... 428/694; 428/611; 428/667; 428/678; 428/900; 428/928
[58] Field of Search .............. 428/611, 678, 694, 900, 428/928, 667

[56] References Cited

U.S. PATENT DOCUMENTS

| | | | |
|---|---|---|---|
| 4,548,871 | 10/1985 | Kobayashi et al. ................. | 428/678 |
| 4,731,300 | 3/1988 | Watanabe et al. .................. | 428/928 |
| 4,758,471 | 7/1988 | Arioka et al. ...................... | 428/694 |
| 4,792,486 | 12/1988 | Ishizaki et al. ..................... | 428/611 |
| 5,006,388 | 4/1991 | Kuzuo et al. ...................... | 428/694 |

Primary Examiner—Paul J. Thibodeau
Attorney, Agent, or Firm—Armstrong, Nikaido, Marmelstein, Kubovcik & Murray

[57] ABSTRACT

A magnetic recording medium having excellent noise characteristics and comprising a metal magnetic film formed on a nonmagnetic substrate and made of (1) a Co-Cr-Nb alloy, or (2) a Co-Cr-Ni-Nb alloy. The alloys (1) and (2) are represented respectively by the following formulae:

$$Co_{1-x-z}Cr_xNb_z \qquad (1)$$

$$Co_{1-x-y-z}Cr_xNi_yNb_z \qquad (2)$$

wherein x, y and z each represent an atomic ratio, x is 0.08 to 0.15, y is 0.05 to 0.25 and z is 0.03 to 0.10.

4 Claims, No Drawings

MAGNETIC RECORDING MEDIUM OF THIN METAL FILM TYPE

FIELD OF THE INVENTION

The present invention relates to magnetic recording media, and more particularly to magnetic recording media of the thin metal film type having excellent noise characteristics.

BACKGROUND OF THE INVENTION

Heretofore used as magnetic recording media for magnetic recording apparatus are those of the coating type which comprise a magnetic film of finely divided iron oxide formed over the surface of a nonmagnetic substrate. However, with improvements in recording-reproduction methods, magnetic heads, magnetic recording media, etc. for use in magnetic recording systems, a rapid advance has been made in recent years in high-density magnetic recording, and magnetic recording media have been changed over from the coating type to the thin metal film type comprising a thin ferromagnetic metal film.

The composition of the thin ferromagnetic metal film is selectively determined in view of the desired magnetic properties, recording-reproduction characteristics, weather resistance, etc. as evaluated collectively. Generally, Co, Co-Ni or Co-Ni-Cr alloys are used for such films.

The magnetic recording media of the thin metal film type prepared with use of such a material have excellent magnetic characteristics for high-density recording but are not always satisfactory in noise characteristics. Accordingly, it has been desired to provide magnetic recording media which are adapted for high-density recording and outstanding in noise characteristics.

The main object of the present invention is to provide a magnetic recording medium which is adapted for high-density recording and lowered in noise level.

SUMMARY OF THE INVENTION

The present invention provides a magnetic recording medium of the thin metal film type characterized in that the metal magnetic film thereof comprises (1) a Co-Cr-Nb alloy, or (2) a Co-Cr-Ni-Nb alloy, the alloys (1) and (2) being represented respectively by the following formulae:

$$Co_{1-x-z}Cr_xNb_z \quad (1)$$

$$Co_{1-x-y-z}Cr_xNi_yNb_z \quad (2)$$

wherein x, y and z each represent an atomic ratio, x is 0.07 to 0.15, y is 0.05 to 0.25 and z is 0.01 to 0.10.

DETAILED DESCRIPTION OF THE INVENTION

The magnetic film consists basically of a Co-Cr alloy or Co-Cr-Ni alloy and further contains Nb added thereto. The Co-Cr alloy and the Co-Cr-Ni alloy have a high coercive force (Hc) and a high residual magnetic flux density (Br). Accordingly, a suitable amount of Nb, when incorporated into these alloys, exhibits a remarkable effect to lower the noise level without impairing the excellent magnetic properties of the alloys. This effect appears attributable to the fact that the presence of suitable amount of Nb varies the magnetic anisotropy of crystals of the magnetic film, makes the crystal grains finer and concentrates Cr at the grain boundary, consequently producing finer and isolated magnetic domains and decreasing the transition width of magnetization.

The alloy composition of the magnetic film of the present invention is defined as above for the following reasons.

The Cr content represented by x is in the range of 0.07 to 0.15 because if it is less than 0.07, the magnetic film is insufficient in weather resistance and because if it is over 0.15, satisfactory magnetic and electrical characteristics are not available.

y representing the Ni content is limited to the range of 0.05 to 0.25 since if it is less than 0.05, Ni fails to exhibit a satisfactory effect to give improved weather resistance. If it is over 0.25, the alloy exhibits a decreased saturation magnetic flux density (Bs) and no longer retains satisfactory magnetic and electrical characteristics.

z representing the Nb content is defined as 0.01 to 0.10 since when it is less than 0.01 Nb fails to fully exhibit an effect to decrease the transition width of magnetization. When exceeding 0.10. the Nb content not only fails to exhibit a corresponding effect but also undesirably impairs the magnetic and electrical characteristics. It is to be noted that even if Nb is added to Cr-free Co or Co-Ni alloys, no effect to improve the noise characteristics is available. The addition of Nb is effective only in the presence of Cr.

The magnetic recording media of the thin metal film type according to the invention include magnetic drums, magnetic tapes, magnetic sheets, etc. in addition to magnetic discs. These media can be prepared by the same processes under the same conditions as conventionally used except that the magnetic film is formed from the Co-Cr-Nb alloy or Co-Cr-Ni-Nb alloy.

For example, magnetic discs for longitudinal recording are prepared by the following process. An aluminum alloy plate or the like serving as the substrate is coated over the surface thereof with a hard Ni-P film (for example, 15 to 25 $\mu$m in thickness) by electroless plating. The plated film is textured and is then formed with a Cr film having a suitable thickness (for example, 500 to 3000 angstroms) and serving as a ground layer for giving longitudinal anisotropy to the magnetic film to be formed. A magnetic film (for example, 500 to 2000 angstroms in thickness) having the above-specified composition is formed over the Cr film. A film having lubricity and abrasion resistance, such as carbonaceous film (for example, 150 to 600 angstroms in thickness), is further formed over the magnetic film to serve as a protective film for preventing the wear and damage of the magnetic film. In this way, a magnetic disc for longitudinal recording can be fabricated which has a multilayer structure.

The layered structure is not limited to the above example. As another example, a Cr film (about 100 to about 500 angstroms in thickness) can be formed over the magnetic film before forming the carbonaceous film thereon to give further improved weather resistance to the disc. The carbonaceous film on the magnetic film can alternatively be covered with a lubricant film (for example, 10 to 100 angstroms in thickness) for imparting improved lubricity to the disc for the protection of the magnetic head. The component films or layers can be formed by sputtering, ion plating, vacuum evaporation or like process.

EXAMPLES

Magnetic discs each having a magnetic film of the invention and magnetic discs each having a comparative magnetic film were prepared in the following manner and tested for recording-reproduction characteristics (noise characteristics) for comparison.

Example 1

Magnetic Film of Co-Cr-Nb Alloy

The surface of an aluminum alloy substrate (130 mm in outside diameter, 40 mm in inside diameter and 1.9 mm in thickness) was coated with an Ni-P film (20 μm in thickness) by electroless plating, and the surface of the film was polished and textured. A Cr film as a ground layer, Co-Cr alloy film or Co-Cr-Nb alloy film as a magnetic film, and carbonaceous film (300 angstroms in thickness) as a lubricant film were then formed in this order over the textured surface by magnetron sputtering (pressure of Ar atmosphere: $0.7 \times 10^{-2}$ torr) to prepare each of the magnetic discs to be tested.

For proper comparison in noise characteristics, the ground layer and the magnetic film of each disc were so formed as to make the comparative disc equivalent to the discs of the invention in coercive force (Hc) and the product (Br·δ) of residual magnetic flux density (Br) and film thickness (δ). The value Hc was 1050 Oe, and the value Br·δ was 450 G·μ. A ferrite head was used for the magnetic discs for recording and reproducing signals at recording line densities of 20KFCI and 28KFCI to determine the ratio of reproduction signal output to medium noise intensity (S/N, dB) and the modulation noise (μVrms). The head used was 18.6μ in gap width, 0.74μ in gap length, 8 μH in inductance, 0.22μ in flying height, 9.5 gf in loading force and 24 in the number of turns of the winding.

The test results achieved by the magnetic discs are shown in Table 1 along with the composition of the magnetic films thereof. In the table, the discs Nos. 1 to 3 are according to the invention, and the disc No. 4 is comparative.

Example 2

Magnetic Film of Co-Cr-Ni-Nb Alloy

Magnetic discs were prepared by the same process under the same conditions as in Example 1 except that the magnetic film alloy was a Co-Cr-Ni alloy or Co-Cr-Ni-Nb alloy, and were tested for recording-reproduction characteristics in the same manner as in Example 1. Table 2 shows the composition of the magnetic film alloys of the discs tested and the test results achieved by the discs. In the table, the discs Nos. 5 to 8 are those of the invention, and the disc No. 9 is comparative.

TABLE 1

| Sample Disc No. | Composition of Magnetic Film | S/N (dB) Recording Line Density | | Modulation Noise (μ Vrms) Recording Line Density | |
|---|---|---|---|---|---|
| | | 20KFCI | 28KFCI | 20KFCI | 28KFCI |
| 1 | $Co_{0.82}Cr_{0.16}Nb_{0.02}$ | 36.3 | 28.0 | 1.6 | 2.8 |
| 1 | $Co_{0.83}Cr_{0.14}Nb_{0.03}$ | 35.0 | 27.5 | 1.9 | 3.2 |
| 3 | $Co_{0.81}Cr_{0.13}Nb_{0.06}$ | 36.0 | 37.8 | 1.7 | 3.0 |
| 4 | $Co_{0.86}Cr_{0.14}$ | 30.5 | 10.5 | 2.2 | 5.0 |

TABLE 2

| Sample Disc No. | Composition of Magnetic Film | S/N (dB) Recording Line Density | | Modulation Noise (μ Vrms) Recording Line Density | |
|---|---|---|---|---|---|
| | | 20KFCI | 28KFCI | 20KFCI | 28KFCI |
| 5 | $Co_{0.69}Cr_{0.10}Ni_{0.18}Nb_{0.03}$ | 35.9 | 28.1 | 1.7 | 3.2 |
| 6 | $Co_{0.66}Cr_{0.12}Ni_{0.20}Nb_{0.02}$ | 34.0 | 28.0 | 1.8 | 3.3 |
| 7 | $Co_{0.70}Cr_{0.08}Ni_{0.15}Nb_{0.07}$ | 36.0 | 28.3 | 1.7 | 3.0 |
| 8 | $Co_{0.67}Cr_{0.10}Ni_{0.17}Nb_{0.06}$ | 35.5 | 28.5 | 1.7 | 3.2 |
| 9 | $Co_{0.70}Cr_{0.10}Ni_{0.20}$ | 31.5 | 12.8 | 2.1 | 4.8 |

The test results of the above examples reveal that the magnetic discs of the invention having the magnetic film of Co-Cr-Nb alloy or Co-Cr-Ni-Nb alloy are improved in noise characteristics over the comparative magnetic discs wherein the magnetic film is made of Nb-free Co-Cr alloy or Co-Cr-Ni alloy, and that the improvement becomes more pronounced at a higher recording density.

The magnetic recording media of the thin metal film type of the invention are low in recording-reproduction noise and are therefore adapted for higher-density recording than the conventional like media. The present recording media can therefore be compacted, given a higher quality and assured of higher performance.

What is claimed is:

1. A magnetic recording medium, adapted to be recorded in the longitudinal direction, and having a substantially lower noise level and substantially unimpaired, excellent magnetic properties, comprising:
   a non-magnetic substrate;
   a Ni-P film coated over a surface of said substrate;
   a Cr film coated on said Ni-P film; and
   a magnetic layer, having a composition of $Co_{1-x-z}Cr_x Nb_z$ wherein each of x, y, and z represent the following atomic ratios: x is 0.12 to 0.15, and z is 0.03 to 0.10; wherein said Cr film layer is a ground layer for, and provides longitudinal anisotropy to, said magnetic medium; and wherein the amount of Nb is sufficient to vary the magnetic anisotropy of the crystals of said magnetic layer, to make said crystal grains finer, to concentrate said Cr at the boundaries of said crystal grains, to produce finer and substantially isolated magnetic domains in said magnetic layer, and to decrease the transition width of magnetization in said magnetic layer.

2. A magnetic recording medium, adapted to be recorded in the longitudinal direction, and having a substantially lower noise level and substantially unimpaired, excellent magnetic properties, comprising:
a substantially non-magnetic substrate;
a Ni-P film coated over a surface of said substrate;
a Cr film coated on said Ni-P film; and
a magnetic layer, comprising crystals having a composition of $Co_{1-x-y-z}Cr_x Ni_y Nb_z$ wherein each of x, y, and z represent the following atomic ratios: x is 0.08 to 0.15, y is 0.05 to 0.25 and z is 0.02 to 0.10;
wherein said Cr film layer is a ground layer for, and provides longitudinal anisotropy to, said magnetic medium; and wherein the amount of Nb is sufficient to vary the magnetic anisotropy of the crystals of said magnetic layer, to make said crystal grains finer, to concentrate said Cr at the boundaries of said crystal grains, to produce finer and substantially isolated magnetic domains in said magnetic layer, and to decrease the transition width of magnetization in said magnetic layer.

3. A magnetic recording medium as claimed in claims 1 or 2 wherein said medium is selected from the group consisting of drums, tapes, sheets and discs.

4. A magnetic recording medium as claimed in claims 1 or 2 wherein said medium is a disc.

* * * * *

UNITED STATES PATENT AND TRADEMARK OFFICE
CERTIFICATE OF CORRECTION

PATENT NO. : 5,082,750
DATED      : January 21, 1992
INVENTOR(S): Toshiaki MORICHIKA et al.

It is certified that error appears in the above-indentified patent and that said Letters Patent is hereby corrected as shown below:

```
On the cover page, Item [73], "Kawasaki" should read as
--Osaka--.
```

Signed and Sealed this

Fourteenth Day of December, 1993

Attest:

BRUCE LEHMAN

*Attesting Officer*     *Commissioner of Patents and Trademarks*